United States Patent [19]

Rappoport

[11] 4,159,693
[45] Jul. 3, 1979

[54] ARTICLE AND METHOD FOR ADDING MARKINGS TO A SPEEDOMETER

[76] Inventor: Roland Rappoport, 830 Turquoise, New Orleans, La. 70124

[21] Appl. No.: 806,693

[22] Filed: Jun. 15, 1977

[51] Int. Cl.² .......................... G01P 1/08; G09F 3/00
[52] U.S. Cl. .................................. 116/62.2; 40/2 R; 156/64; 428/42
[58] Field of Search ................. 116/116, DIG. 47; 40/337, 2 R; 428/914, 31, 42

[56] References Cited

U.S. PATENT DOCUMENTS

| | | | |
|---|---|---|---|
| 2,073,844 | 3/1937 | Lowenfels | 428/31 |
| 3,409,987 | 11/1968 | New | 116/114 R X |
| 3,855,958 | 12/1974 | Briscoe | 116/DIG. 47 X |
| 3,980,041 | 9/1976 | Evans | 116/116 |
| 4,092,191 | 5/1978 | Jonas | 116/DIG. 47 X |
| 4,108,103 | 8/1978 | Ammar | 116/116 |

FOREIGN PATENT DOCUMENTS 1251425  10/1971  United Kingdom ............ 116/DIG. 47

*Primary Examiner*—Daniel M. Yasich
*Attorney, Agent, or Firm*—Schwartz, Jeffery, Schwaab, Mack, Blumenthal & Koch

[57] ABSTRACT

A flat support includes a first series of markings corresponding to a pre-existing measurement system of an instrument, such as miles per hour of an automobile speedometer. On the same support is a second series of markings corresponding to a second measurement system, such as kilometers per hour. Each marking of the second series is in registry with a marking of the same relative value in the first series. A speed value from the first series is selected, and a corresponding speed value from the second series is removed from the support and transferred to a point on the speedometer corresponding to the selected speed value of the first series of markings. This is repeated until a complete set of speed markings is transferred to the speedometer.

11 Claims, 8 Drawing Figures

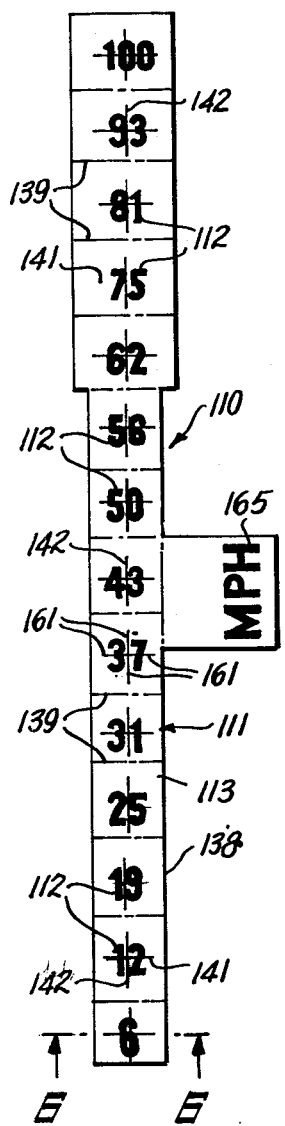
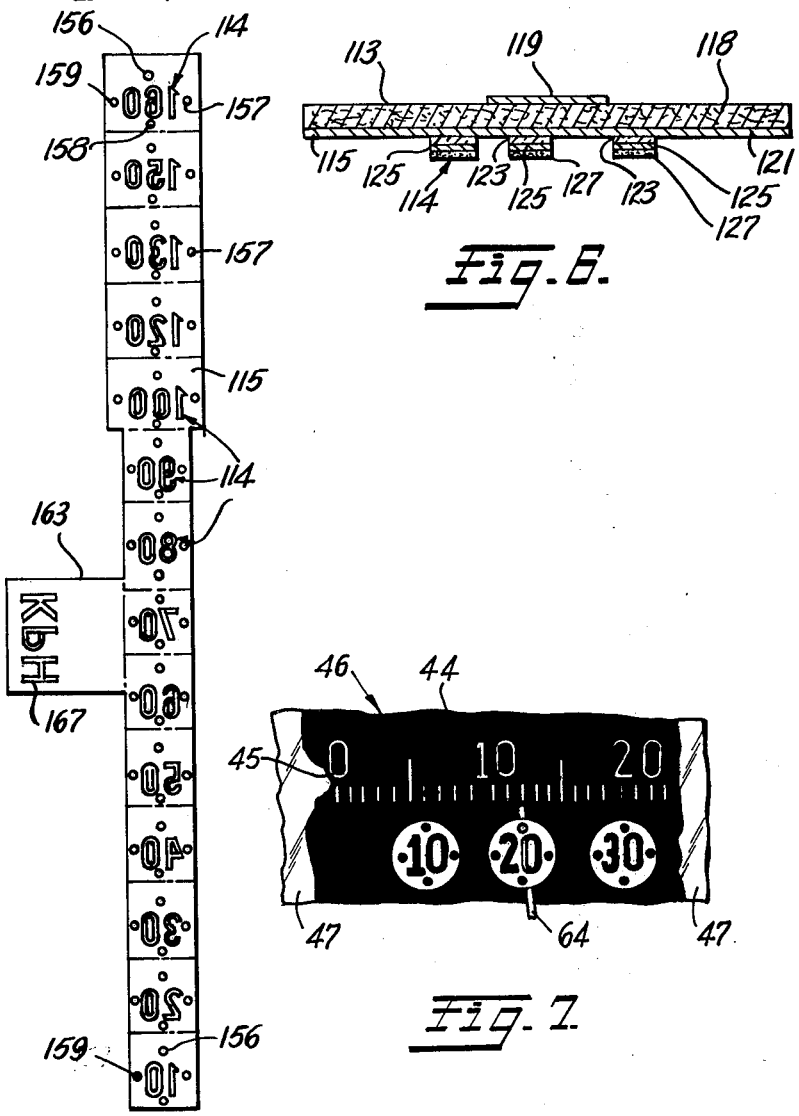
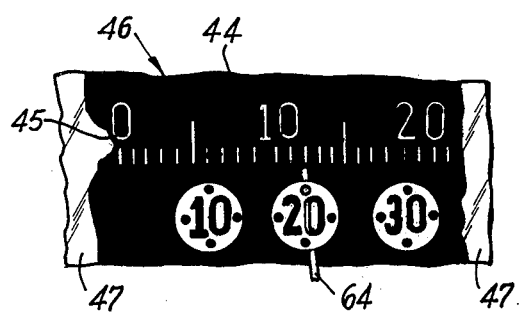
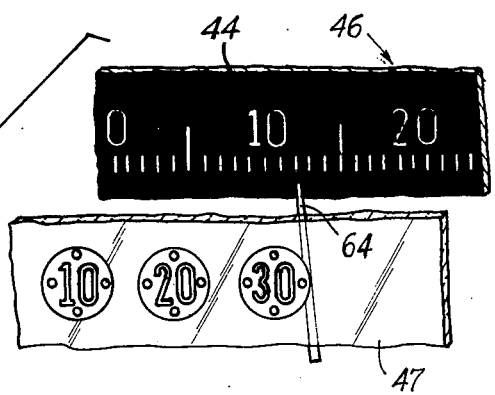

ARTICLE AND METHOD FOR ADDING MARKINGS TO A SPEEDOMETER

BACKGROUND OF THE INVENTION

This invention relates to an article method for modifying instruments of the type having a single series of markings of one measurement system to include another series of markings of another measurement system. For example, the article and method of the present invention is particularly useful for modifying automobile speedometers having only miles per hour markings to include kilometers per hour markings.

It has been proposed that all signs on United States federal highways which presently indicate speed limits in miles per hour be replaced with signs indicating speed limits only in kilometers per hour. This is part of an overall program to convert standards of measurement in the United States from the English system to the metric system. It has also been proposed that, in the interest of cost savings, a direct change from miles per hour to kilometers per hour be made without an interim change wherein signs would show speed limits in both miles per hour and kilometers per hour.

While certain late model automobiles manufactured in the United States have speedometers including an auxiliary scale showing kilometers per hour, a substantial number of automobiles in use in the United States today have speedometers having only miles per hour scales. The present invention provides an article and method for adding to such speedometers scales showing speeds in kilometers per hour. While the present invention specifically contemplates modification of automobile speedometers, its application is not limited thereto. Rather, the invention may be used in connection with the modification of any instrument to include markings corresponding to a system of measurement different from that of the pre-existing series of markings on the instrument.

It has previously been known to add additional series of markings to instruments by covering the entire face of the instrument with a sheet having the additional series of markings thereon. A drawback in this regard is the great variation often encountered in the sizes and shapes of instrument faces and the consequent need for stocking many different sizes and shapes of sheets. This problem is particularly severe in the case of automobile speedometers where the variations in instrument faces of different models of automobiles are pronounced.

SUMMARY OF THE INVENTION

It is an object of the invention to overcome the drawbacks of known instrument conversion articles and methods and to provide a new very simple, and inexpensive instrument modification article and method.

It is a more particular object of the present invention to provide a system of instrument modification wherein many different instruments of a certain type can be modified by the use of identical articles therefor, regardless of variations in the shapes of the instrument faces.

It is a further object of the invention to provide an article which may be used for modification of an automobile speedometer to include an additional series of speed markings which does not require any special tools and which may be easily used by an average automobile owner.

It is a further object of the invention to provide a method for modifying an automobile speedometer which is very simple and may be practiced by an average automobile owner requiring only a simple sheet-like article and not requiring special tools or expertise.

It is a further object of the invention to provide a system for modifying an instrument by adding thereto markings which are compatible with existing instrument lighting systems to provide ready visibility of the markings in conditions of darkness.

It is a further object of the invention to provide a system for modifying an instrument wherein each marking to be added is separately transferred to the face of the instrument.

It is a related object of the invention to provide a system for modifying an instrument wherein alignment of each marking with a corresponding, pre-existing marking on the instrument is facilitated.

It is a particular object of the invention to provide a system for modifying an automobile speedometer of the type having speed markings only in miles per hour to include speed markings in kilometers per hour.

It is a related object of the invention to provide an article for modifying an automobile speedometer, which article also includes one or more English-metric conversion tables to be affixed to the automobile.

These objects are achieved by providing a first series of markings on a support corresponding to a first pre-existing measurement system of an instrument, such as miles per hour of an automobile speedometer. A second series of markings, such as kilometers per hour, is provided on the same support, each marking of the second series being in registry with the marking of the same relative value in the first series. Each marking of the second series, that is, each kph marking, is removable from the support, so as to be transferrable to the instrument.

In one embodiment the flat support includes a backing sheet and a transparent sheet overlying the backing sheet. Both series of markings are on the same side of the support. Each marking of the second series, e.g. each kph marking, is disposed within a separable portion of the sheet which is different from any portion on which any other such marking is disposed. Each separable portion is defined by a closed peripheral cut extending through the transparent sheet but not through the backing. In this embodiment, each marking is preferably defined by an opaque coating on the particular separable portion of the transparent sheet on which the marking is disposed. The coating covers most of the separable portion but does not cover the marking; that is, the marking itself is transparent with an opaque area surrounding the marking and filling any interstices thereof to outline the marking. Under conditions of darkness and with the instrument lights on, the marking will be readily visible by way of light shining through the marking but not through the layer of opaque material outlining the marking.

In another embodiment, the first series of markings, e.g., the mph series, is disposed on one side of a support strip, and a second series of markings, e.g. the kph series, is disposed on the other side. The second series of markings includes an outer adhesive layer. The markings on this other side may be transferred to the instrument by way of the grip of the adhesive layer.

With either type of article, a speed marking is selected from the first series of markings (e.g. the mph series) and a point is located on the instrument corresponding in value to the selected marking. A speed marking of the second series, e.g. the kph series, in registry with the selected speed marking of the first series, is transferred from the support to the speedometer, the transfer being to the located point on the speedometer. This process is repeated until a complete set of speed markings corresponding to an additional system of measurement (e.g. kph) has been provided on the speedometer.

Other objects, features and advantages of the invention will become apparent from the following description taken in conjunction with the accompanying drawing.

BRIEF DESCRIPTION OF THE DRAWING

FIG. 4 is a plan view of one side of another embodiment of the article of the invention;

FIG. 5 is a plan view of the opposite side of the article of FIG. 4;

FIG. 6 is an enlarged, fragmentary sectional view taken on the line 6—6 of FIGS. 4 and 5, the thicknesses of the various material layers of FIG. 6 being greatly exaggerated for purposes of illustration;

FIG. 7 is a fragmentary front elevational view of an automobile speedometer after an additional series of speed markings have been transferred thereto in accordance with the invention;

FIG. 8 is an exploded, fragmentary view of the portion of the automobile speedometer shown in FIG. 7.

DETAILED DESCRIPTION

Figure 1:
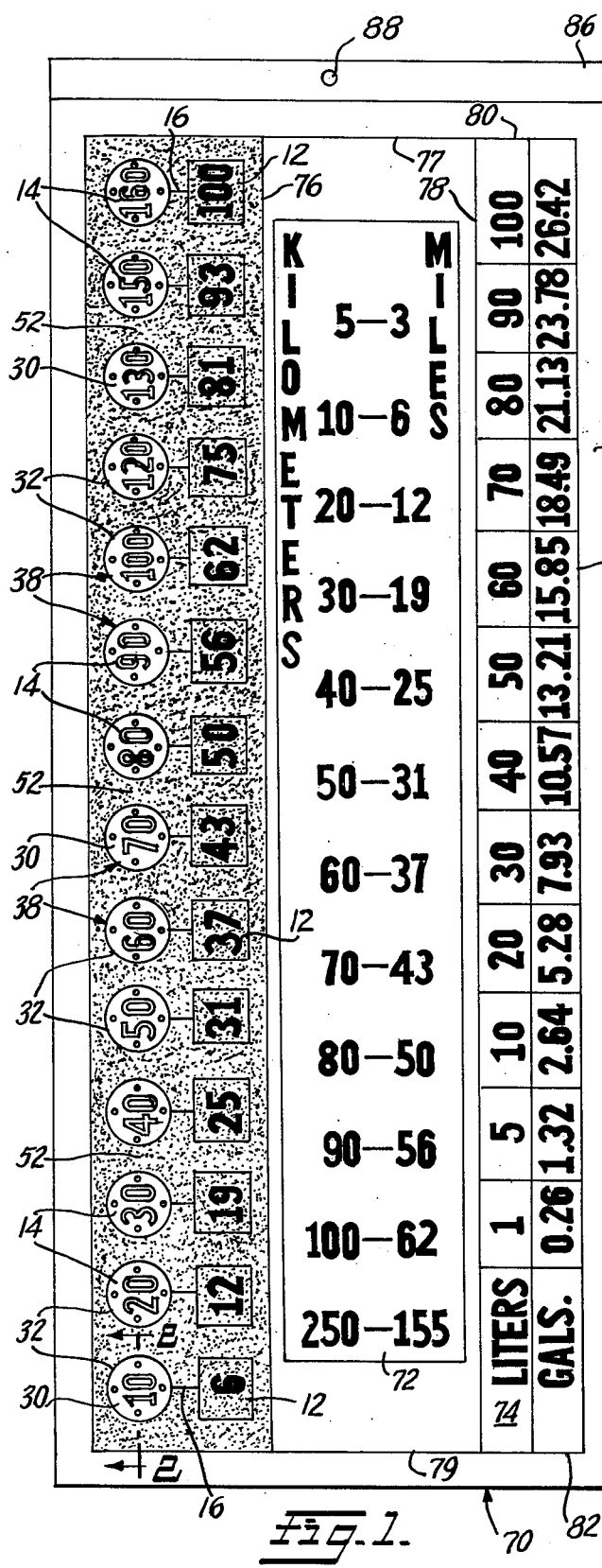
FIG. 1 is a plan view of one embodiment of the article of the present invention.

In the following description and in the drawing like reference characters refer to like elements or features among the various figures of the drawing.

Referring to FIG. 1, reference numeral 10 generally designates an article for adding markings to an instrument. In the embodiment shown, the article is intended for use in modifying an automobile speedometer of the type having a single series of speed markings of one speed measurement system, in particular, a series of miles per hour (mph) markings of the English system of speed measurement. The particular device shown and described herein to exemplify the invention is intended for modifying a speedometer of this type to include another series of speed markings of another speed measurement system, i.e., kilometers per hour (kph) markings of the metric system.

The article of FIG. 1 includes a support 11 and a series of speed markings 12 corresponding to a pre-existing measurement system of an instrument, in this case miles per hour markings of an automobile speedometer. Also included are speed markings 14 of a second series of markings corresponding to a second, different measurement system, in this case kilometers per hour. As shown, each mph marking 12 is disposed in side-by-side relationship with respect to a kph marking 14. That is, each marking 14 of the kph series is in registry with a marking of the same relative value in the first series, i.e. the mph series. In the illustrated embodiment the registry between each speed marking 14 of the kph series with a speed marking 12 of the mph series corresponding to the same relative speed value is enhanced by a connecting line 16 extending between each pair of adjacent markings 12, 14. The entire set of indicator lines 16 are all parallel to each other and equally spaced along the length of support 11. The markings 14 of the kph series are preferably in progressions of tens and twenties, as shown, and the corresponding markings 12 of the mph series are preferably rounded off to the nearest whole integer of the equivalent speed. As is apparent from FIG. 1 both the speed markings 12 of the mph series and the speed markings 14 of the kph series are both located on the same side of support 11.

Figure 2:
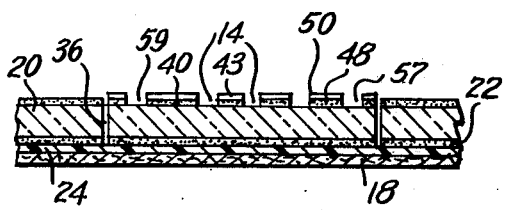
FIG. 2 is an enlarged fragmentary sectional view taken on the line 2—2 of FIG. 1, the material layers shown in FIG. 2 being greatly exaggerated in thickness for purposes of illustration.

In the fragmentary view of FIG. 2, the construction of support 11 is illustrated, the various layers of material being greatly exaggerated in thickness for purposes of illustration. Support 11 includes an opaque, paper backing sheet 18, a transparent plastic sheet 20 overlying backing sheet 18 and a layer of adhesive material 22 between transparent sheet 20 and backing sheet 18. Transparent sheet 20 is preferably of soft vinyl material. Adhesive 22 is a pressure sensitive adhesive affixed to transparent sheet 20. A coating 24 on backing sheet 18 allows easy release of the transparent sheet 20 and adhesive layer 22 from backing 18. Support 11, including backing 18, transparent sheet 20, adhesive layer 22, and coating 24 is a conventional and readily available commercial item.

Each marking 14 is disposed within an area 30 defined by a closed, peripheral border 32. Border 32 is coextensive with a closed peripheral cut 36 (see especially FIG. 2) extending entirely around area 30. Cut 36 extends entirely through transparent sheet 20 but does not extend into backing sheet 18. Cut 36 is formed by die cutting transparent sheet 18 and, more particularly, is formed by a process known in the trade as "kiss cutting".

Each area 30, by virtue of its being surrounded by closed peripheral cut 36, defines a separable portion or piece 38 of the overall transparent sheet 20. As will be apparent from FIG. 1, each separable portion 38 has only a single speed marking thereon. In other words, each speed marking of the kph series is disposed within a separable portion 38 of the transparent sheet 20 which is different from any portion of transparent sheet 20 on which any other speed marking of the kph series is disposed.

Each speed marking 12 is defined by an opaque coating 40 on the separable portion 38 associated therewith. Opaque coating 40 outlines each marking so that the marking itself is provided by the absence of opaque coating and is therefore transparent. In other words, opaque coating 40 surrounds each marking and fills any interstices 42 thereof.

To achieve the optimum compatibility with automobile speedometers and other instruments, the outer face 43 of opaque coating 40 will preferably be white in color. In this regard, most automobile speedometers and many other types of instruments have black or at least dark backgrounds with white indicia thereon, such as black face 44 and white speed markings 45 on the speedometer 46 of FIGS. 7 and 8. Thus the white face 43 of opaque coating 40 will provide the maximum contrast with such a background. It will be understood that while each marking 14 outlined by opaque coating 40 is transparent, it will have a black or dark appearance contrasting with the white face 43 of coating 40 when installed on an automobile speedometer or other instrument having a black or dark background. This is shown in FIG. 7.

It is preferred that each separable portion 38 be mounted on the usual exterior transparent glass or cover 46 of the speedometer. Under conditions of darkness, the white face of each portion or piece 38 will not be readily visible, but the instrument lights, such as the dash lights of an automobile speedometer, will shine from behind the series of pieces 38 and through the transparent markings 14 thereof so that the markings will be brightly visible.

To provide the best visibility both under conditions of instrument lighting and under conditions of natural light, it is important that the outer coating 40 surrounding transparent markings 14 of pieces 38 be entirely opaque. To accomplish this, a coating of black or dark enamel paint 48 is first applied to the area 30 of each piece surrounding the marking 14, preferably by a silk-screen process. This is followed by a coating of white enamel paint 50, again applied by silkscreening, to provide the white outer face 43 discussed above.

Prior to the application of the black enamel coating 48, a base coating of a bright color such as red may be applied to the area 52 surrounding the separable portions 38. The mph markings 12 and connecting lines 16 may be applied by silkscreening black enamel paint over this background at the same time as the layer of black enamel paint 48 is applied to the separable portions 38.

The backings of most commercially available transparent sheets with pre-applied pressure sensitive adhesive have a distinctly off-white color. When such sheets are used to provide the support 11, the off-white backing will show through the transparent markings 14 and provide sufficient contrast with the pure white face 43 of the separable portions 38 to render markings 14 adequately visible. As an alternative, a black backing sheet similar to the off-white backing 18 may be provided, in which case markings 14 would appear black even before transfer of portions 38 to the speedometer.

As an alternative to locating pieces 38 on the transparent cover of the speedometer, the cover may be removed and the pieces 38 placed on the face 44 of the speedometer. As with the above arrangement, the black face 44 will show through the transparent markings 14 to provide maximum contrast with white faces 43 of pieces 38. In conditions of darkness, the instrument lights will be in front of the transferred markings 14, and the light thereof will reflect off the white faces 43 of pieces 38 so that the markings 14 will be brightly visible.

Each separable portion or piece 38 includes reference indicia to facilitate alignment of each speed marking 14 with a corresponding point along the scale of speed markings 45 of the automobile speedometer. The reference indicia are provided by a set of transparent dots 56, 57, 58 and 59 (see especially FIG. 3) surrounding each speed marking 14. One pair of transparent dots 56, 58 are aligned on a vertical axis 60 (FIG. 3), each vertical axis 60 being coextensive with an associated connecting line 16 (FIG. 1). Another pair of transparent dots are aligned on a horizontal axis 62 (FIG. 3) which is perpendicular to vertical axis 60. Depending upon the particular configuration of the face of the speedometer to be modified and depending on the available space thereon, one of the four transparent dots 56, 57, 58, 59 is selected for alignment with a point on the scale of existing markings 45 on the speedometer. In FIGS. 7 and 8, the uppermost dot 56 has been chosen for alignment on the scale. The selected dot 56 also serves to provide an indicator point for the speedometer needle 64. When the needle 64 reaches a point corresponding to the value shown by marking 14 of any particular piece 38, the needle 64 will be visible through the selected dot 56. This visibility of the needle 64 is shown in FIG. 7 in connection with the particular piece 38 which has a marking 14 for 20 kph.

It will be understood that, even when one of the dots 56, 57, 58, 59 has been selected for alignment with the speedometer scale 54, the other dots still serve to facilitate alignment of the pieces 38 with the speedometer scale 54 and with each other. That is, the dots serve to give reference points by which the vertical and horizontal axes 60, 62 may be envisioned.

As will be apparent from FIG. 1, the sets of speed markings, 12, 14 are disposed in a region of support 11 generally defined by a brightly colored area 52 and its surrounding borders. Another area, generally referred to by reference numeral 70, includes other materials for facilitating English-Metric conversion. In the specific embodiment shown in FIG. 1, there is one separable strip 72 having a kilometers-miles conversion table and another separable strip 74 having a liters-gallons conversion table 74. Separable strip 72 is surrounded by a completely enclosed cut extending through transparent sheet 20 but not through backing 18. The cut falls along lines 76, 77, 78 and 79 and is formed in the same manner as described in connection with cuts 36 of separable portions 38. Similarly, separable strip 74 is bordered by an enclosed cut falling along lines 78, 80, 81 and 82. The cut surrounding strip 74 is formed in the same manner as the other enclosed cuts.

The indicia on separable strips 72 and 74 will preferably be provided by silkscreening black enamel onto transparent sheet 20 at the same time as the black enamel coating 48 and black speed markings 12 are silkscreened onto the transparent sheet as described above. By virtue of the cuts surrounding strips 72, 74, the portions of the transparent sheet 20 on which these strips are located may be separated from the backing 18. By virtue of the layer 22 of pressure sensitive adhesive, strips 72, 74 may be applied to any convenient location in the automobile.

A section 86 at one end of the support 10 includes an opening 88 for hanging the article 10 on a display rack. Section 86 also includes space for identification of source, instructions, and promotional material.

FIGS. 4-6 depict another embodiment of the article of the invention, the article there being generally referred to by reference character 110. Article 110 includes a support strip 111. A series of permanently affixed markings 112, corresponding to a pre-existing measurement system of an instrument, such as miles per hour of an automobile speedometer, are disposed on a front side 113 of support strip 111. The front side 113 is shown in FIG. 4. A series of transferrable markings 114 of a different measurement system, e.g. kilometers per hour, are disposed on the reverse side 115 of support strip 111. Reverse side 115 is shown in FIG. 5. As will be apparent from FIG. 5, kph markings 114 will appear backwards or reversed when side 115 is turned to face the viewer. That is, the markings 114 will appear as mirror images of normal numbers.

Each marking 114 is in registry with a marking 112 of the same relative value. In the embodiment of FIGS. 4-6 this registry is provided by locating each pair of markings 112, 114 corresponding to a single speed value on directly opposite sides from each other on the support. Thus the marking 112 showing 6 mph on front side 114 is located directly opposite the marking 114 for 10 kph on the reverse side. Likewise the marking 112 for 13 mph is located directly opposite to the marking 114 for 20 kph. Again, the speed values indicated by the kph markings 114 are in progressions of tens and twenties and the spaced values indicated by the mph markings 112 are rounded off to the nearest whole integer.

The construction of support strip 111 is shown in FIG. 6, the material layers thereof being greatly exaggerated in thickness for purposes of illustration. Support strip 111 includes an opaque paper backing 118. The mph markings 112 are provided by conventional printing ink 119 applied to front side 113 of paper backing 118. A waxy coating 121 overlies paper backing 118 on the reverse side 115 of support 111. Kph markings 114 are provided by a layer of clear material 123 adjoining waxy coating 121, a layer of opaque material 125, preferably in the form of a white enamel coating, adjoining and overlying the layer of clear material 123, and a layer of pressure sensitive adhesive 127 adjoining and overlying the clear material. Preferably, layers 123, 125, and 127 are all applied by a silkscreen process, the areas of application being limited so that each layer takes the form of a kph marking 114.

To transfer a kph marking 114 to the surface of a transparent speedometer covering or to a surface of a speedometer face, reverse side 115 is pressed against the surface at a point corresponding to the mph value shown by a selected marking 112 on the front side. Further pressure is applied by rubbing a hard object against front side 113 causing adhesive layer 127 of marking 114 to grip the surface. When this has been accomplished, support 111 may be removed from the surface, leaving behind on the surface layers 123, 125 and 127 which form the kph marking 114. Waxy coating 121 on backing 118 facilitates separation of kph marking 114 from the support 111. Clear layer 123 of marking 114 will be the outermost layer of the marking 114 after it is transferred to the selected speedometer surface. Layer 123 protects marking 114, particularly the white enamel layer 125 thereof, after transfer to the speedometer.

To facilitate transfer of the markings 114 to the speedometer, each marking 114 and the one associated marking 112 on the front side 113 are mounted on a separable portion or piece 138 of support strip 111. Each piece is rendered separable by perforated paths 139 extending transversely across support strip 111 between adjacent speed markings.

Figure 3:
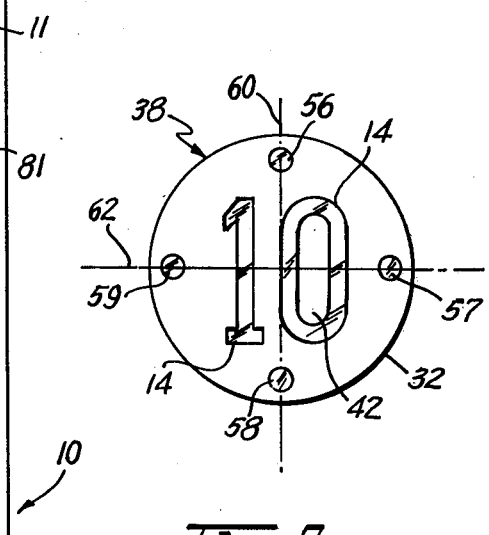
FIG. 3 is an enlarged detailed plan view of one of the separable portions of the article of FIG. 1 when separated from the backing.

In the embodiment of FIGS. 4–6 markings 114, when mounted on the transparent cover of the speedometer, will not have the advantages of visibility under conditions of darkness that the markings 14 of the embodiment of FIGS. 1–3 will have. Nevertheless, if the transparent cover is removed and the markings 114 are mounted on the black speedometer face 44, the markings will then be visible under conditions of darkness. Light from the dash lamps of the automobile will then reflect off the white surfaces of the markings 114 toward the driver.

To facilitate alignment of the speed markings 114 with each other and with the pre-existing scale on the speedometer, reference indicia in the form of vertical and horizontal cross hairs 141, 142, respectively, are centrally located on the front side 113 of support strip 111. Each separable portion 138 includes one set of cross hairs 141, 142, and each set of cross hairs 141, 142 intersects the center of one of the mph markings 112.

To facilitate reading of the speedometer after transfer of the kph markings 114 thereto, each marking 114 is surrounded by a series of dots 156, 157, 158 and 159 (see the particular kph speed marking 114 corresponding to 160 kph in FIG. 5). These dots are disposed along axes which are generally coextensive with cross hairs 141, 142 on the opposite, front side 113. In particular, dots 156, 158 are aligned along an axis coextensive with vertical cross hair 141, and dots 157, 159 are aligned along an axis coextensive with horizontal cross hair 142. Dots 156, 157, 158 and 159 are of the same layered construction discussed in connection with markings 114 and are transferred to the speedometer along with the markings 114.

Except for their being opaque rather than transparent, dots 156, 157, 158 and 159 have the same function as dots 56, 57, 58 and 59 described previously in connection with the embodiments of FIGS. 1–3. It will be understood that a selected one of the dots 156, 157, 158, 159 may be precisely located along the pre-existing speedometer scale 45, and, after transfer to the speedometer, this selected dot may function as a speed indicator point. In this regard, the location of the selected dot is controlled by aligning one of the outer free ends or tips 161 (see the cross hairs intersecting the particular mph marking 112 corresponding to 37 mph in FIG. 4) with the selected point along the speedometer scale corresponding with the speed value of the selected mph marking 112.

Support 111 may include a tab 163, the front side of which includes indicia 165 indicating the system of measurement of markings 112, in this case, miles per hour. Likewise, tab 163 may include on the reverse side indicia 167 indicating the system of measurement of markings 114, in this case kilometers per hour.

Turning to the method of using either of the above-described articles 10 and 110, a speed value is first selected from the series of markings 12 or 112 of the same speed measurement system found on the speedometer, in this case miles per hour. Then a point is located on the speedometer corresponding to the selected marking of the mph system. The process may begin, for example, with the lowest value speed marking in the series of markings 12, or 112. In the embodiment shown this would be the marking corresponding to 6 mph. Then a point corresponding to 6 mph is located on the pre-existing speedometer scale 45. Thereafter, a marking 14 or 114 (in this instance the 10 kph marking) in registry with the selected marking 12, or 112 is transferred from the support 11 or 111 to the transparent cover 47 of the speedometer 46 or to the speedometer face 44.

The transfer is such that the transferred marking is in registry with the located point on the speedometer scale 45. This may be accomplished by aligning with the located point a selected dot from the group 56, 57, 58 and 59 or a selected tip 161 corresponding to a dot from the group 156, 157, 158 or 159, as discussed above. The foregoing steps are then repeated, and additional speed markings are transferred to the speedometer until a complete set of kph markings is provided. More precisely, it might be said that the selecting, locating and transferring steps are repeated n-1 times when n is the number of speed markings 14 or 114 to be included on the speedometer.

It will be understood that while terms such as "vertical", "horizontal", and "front" have been used in the foregoing description, these terms are meant to describe relative relationships only, and are not terms of limitation. It will also be understood that, while the invention has been described and illustrated by way of particular preferred embodiments, many modifications, variations and other uses of the invention may be made without departing from the spirit and scope thereof.

What is claimed is:

1. An article for modifying an automobile speedometer of the type having a single series of miles per hour speed markings to include a series of kilometers per hour speed markings, the article comprising:
   (a) a backing sheet;
   (b) a transparent sheet overlying said backing sheet;
   (c) a layer of adhesive material between said transparent sheet and said backing sheet;
   (d) a series of miles per hour speed markings on one of said sheets;
   (e) a series of kilometers per hour speed markings on said transparent sheet, each speed marking of said kilometers per hour series being adjacent to and in registry with a marking of said miles per hour series which corresponds to the same relative speed value, each speed marking of said kilometers per hour series being disposed within a separable portion of said transparent sheet which is different from any portion of said sheet on which any other speed marking of said second series is disposed, each speed marking of said kilometers per hour series being transparent and being defined by an opaque coating on said transparent sheet, said opaque coating surrounding each speed marking of said kilometers per hour series and filling any intersticies thereof, whereby the absence of opaque material provides said transparent marking;
   (f) means for separating said sheet portions from said transparent sheet, said separating means including a set of closed cuts through said transparent sheet but not through said backing sheet, each cut extending entirely around one of said separable sheet portions, whereby said sheet portions may be separately applied to an automobile speedometer to provide kilometers per hour markings thereon.

2. An article as defined in claim 1 wherein said layer of adhesive is a pressure sensitive adhesive material on said transparent sheet, whereby each separable sheet portion has a layer of pressure sensitive adhesive on one side after separation from said backing sheet.

3. An article as defined in claim 1 wherein said layer of opaque material include a coating a dark enamel paint on said transparent sheet and a coating of light enamel paint over said coating of dark enamel paint.

4. An article for modifying an automobile speedometer of the type having a single series of speed markings of one speed measurement system to include another series of speed markings of another speed measurement system, the article comprising:
   (a) a backing sheet;
   (b) a transparent sheet overlying said backing sheet;
   (c) a layer of adhesive material between said transparent sheet and said backing sheet;
   (d) a first series of speed markings on one of said sheets, said first series corresponding to said one speed measurement system of an automobile speedometer;
   (e) a second series of speed markings on said transparent sheet, said second series corresponding to said other speed measurement system, each speed marking of said second series being adjacent to and in registry with a marking of said first series which corresponds to the same relative speed value, each speed marking of said second series being disposed within a separable portion of said transparent sheet which is different from any portion of said sheet on which any other speed marking of said second series is disposed;
   (f) means for separating said sheet portions from said transparent sheet, whereby said sheet portions may be separately applied to an automobile speedometer to provide speed markings corresponding to said other system of speed measurement; and
   (g) means for facilitating alignment and placement of each speed marking of said second series on the automobile speedometer, said alignment means including reference indicia on each separable portion of said transparent sheet, said reference indicia comprising a set of transparent dots surrounding each speed marking of the second series, said set of transparent dots including a first pair of transparent dots aligned on a first line and a second pair of transparent dots aligned on a second line which is perpendicular to said first line, whereby one of said dots of each separable portion may serve as a speed indicator point after installation of said separable portions on the automobile speedometer.

5. An article as defined in claim 4 wherein said first and second series of speed markings are disposed in one area and wherein said backing sheet and transparent sheet extend into another area, said other area including a separable strip defined by a closed peripheral cut extending through said transparent sheet but not through said backing sheet, said separable strip including an English-Metric conversion table.

6. An article for adding markings to a speedometer, the article comprising:
   (a) a flat support;
   (b) a miles per hour series of markings on one side of said support, said miles per hour series corresponding to a miles per hour measurement system of the speedometer; and
   (c) a kilometers per hour series of markings on the other side of said support, each kilometers per hour marking of said kilometers per hour series being in registry with a marking of the same relative value in said miles per hour series, each marking of said kilometers per hour series being separately removable from said support, whereby the markings of the kilometers per hour series may be transferred to an instrument.
   (d) said support comprising a strip of paper having a waxy coating on said other side, each kilometers per hour marking including a layer of clear material adjoining said waxy coating, a layer of opaque material adjoining said layer of clear material, and a layer of pressure sensitive adhesive adjoining said layer of opaque material, whereby engaging said other side with the speedometer and applying pressure to said one side transfers each marking of said kilometer per hour series to the instrument.

7. An article as defined in claim 6 including means for facilitating alignment of each marking of said kilometers per hour series with a corresponding marking of the instrument speedometer.

8. An article as defined in claim 7 wherein said alignment means includes reference indicia associated with each marking of one of said series of markings.

9. A method of modifying an automobile speedometer of the type having a miles per hour series of speed markings to include a kilometers per hour series of speed markings, the method comprising the steps of:
(a) selecting a miles per hour marking from a series of miles per hour markings on a flat support;
(b) locating a point on said speedometer corresponding in speed value to the selected miles per hour marking;
(c) transferring from the support to the speedometer a speed marking of a kilometers per hour series on the support which is in registry with the selected miles per hour speed marking on the support, the transfer being such that the transferred kilometers per hour marking is in registry with the located point on the speedometer, the flat support including a transparent sheet overlying a backing sheet and a layer of pressure sensitive adhesive on one side of the transparent sheet; said transferring step including removing a separable portion of said transparent sheet from said backing sheet, said separable portion including a single speed marking of the kilometers per hour series each separable portion of the kilometers per hour series including alignment indicia associated therewith;
(d) aligning the separable portion with the located point by use of the alignment indicia;
(e) applying the separable portion to the automobile speedometer such that at least a portion of the alignment indicia of the separable portion serves as a speed indicator point after installation of the separable portion on the automobile speedometer; and
(f) thereafter, repeating said selecting, locating, transferring, aligning, and applying steps n−1 times where n is the number of speed markings of said other speed measurement system to be included on the speedometer.

10. A method of modifying an automobile speedometer of the type having a single series of speed markings of one speed measurement system to include another series of speed markings of another speed measurement system, the method comprising the steps of:
(a) selecting a speed marking from a first series of markings of said one system on a flat support;
(b) locating a point on said speedometer corresponding in speed value to the selected marking of said first series
(c) transferring from the support to the speedometer a speed marking of a second series on the support which is in registry with the selected speed marking of said first series, said second series corresponding with said other speed measurement system, the transfer being such that the transferred marking is, after transfer, in registry with the located point on the speedometer, the support including speed markings corresponding to said one system on one side thereof and speed markings and at least one reference indicia corresponding to the other system on the other side thereof; said selecting step including selecting a speed marking on said one side of said support; and said transferring step including aligning said selected speed marking with said located point and applying pressure to said one side of said support, whereby said speed marking and said reference indicia on said other side is transferred to said speedometer; and
(d) thereafter, repeating said selecting, locating and transferring steps n−1 times when n is the number of speed markings of said other speed measurement system to be included on the speedometer.

11. A method as defined in claim 10 wherein said one speed measurement system is miles per hour and said other speed measurement system is kilometers per hour.

* * * * *